United States Patent
Lu

(10) Patent No.: US 10,157,406 B2
(45) Date of Patent: Dec. 18, 2018

(54) CHARGE FARE METER

(71) Applicant: Etron Technology, Inc., Hsinchu (TW)

(72) Inventor: Chao-Chun Lu, Taipei (TW)

(73) Assignee: eEver Technology, Inc., Taipei (TW)

( * ) Notice: Subject to any disclaimer, the term of this patent is extended or adjusted under 35 U.S.C. 154(b) by 431 days.

(21) Appl. No.: 14/705,959

(22) Filed: May 6, 2015

(65) Prior Publication Data

US 2015/0326048 A1 Nov. 12, 2015

Related U.S. Application Data

(60) Provisional application No. 61/989,544, filed on May 7, 2014.

(51) Int. Cl.

| H02J 7/00 | (2006.01) |
|---|---|
| G06Q 30/04 | (2012.01) |
| G06Q 50/06 | (2012.01) |
| H02J 50/80 | (2016.01) |
| H02J 50/00 | (2016.01) |
| H02J 50/10 | (2016.01) |

(52) U.S. Cl.
CPC .............. *G06Q 30/04* (2013.01); *G06Q 50/06* (2013.01); *H02J 7/0047* (2013.01); *H02J 7/0052* (2013.01); *H02J 50/00* (2016.02); *H02J 50/80* (2016.02); *H02J 50/10* (2016.02)

(58) Field of Classification Search
CPC ...... G06Q 20/145; G06Q 30/04; G06Q 50/06; G07F 15/003; G07F 15/006; H02J 7/0052; H02J 50/00; H02J 50/80; H02J 7/0047; H02J 50/10
See application file for complete search history.

(56) References Cited

U.S. PATENT DOCUMENTS

| 2012/0150670 A1* | 6/2012 | Taylor | G06Q 20/10 705/16 |
|---|---|---|---|
| 2013/0335027 A1* | 12/2013 | Xin | G07F 17/20 320/114 |
| 2014/0247004 A1* | 9/2014 | Kari | H02J 5/005 320/106 |

* cited by examiner

*Primary Examiner* — Nha T Nguyen
(74) *Attorney, Agent, or Firm* — Winston Hsu

(57) ABSTRACT

A charge fare meter includes a charge module and a display. The charge module is used for outputting a direct (DC) current and calculating total charges, wherein the charge module includes an input interface, a calculating unit, and an output interface. The input interface is used for converting power provided by an alternating current power source or the DC power source into the DC current. The calculating unit is electrically connected to the input interface for calculating the total charges. The output interface is electrically connected to the calculating unit for outputting the DC current. The display is electrically connected to the charge module for displaying the DC current, a voltage corresponding to the DC current, or a charge fare corresponding to the total charges.

9 Claims, 5 Drawing Sheets

CHARGE FARE METER

CROSS REFERENCE TO RELATED APPLICATIONS

This application claims the benefit of U.S. Provisional Application No. 61/989,544, filed on May 7, 2014 and entitled "Charge meter," the contents of which are incorporated herein by reference.

BACKGROUND OF THE INVENTION

1. Field of the Invention

The present invention relates to a charge fare meter, and particularly to a charge fare meter that can generate a charge fare corresponding to total charges passing through the charge fare meter during a charging period of the portable device.

2. Description of the Prior Art

Nowadays, portable devices have become widely popular. However, because a battery life of a portable device is too short so that charging a battery within the portable device keeps disturbing a user owned the portable device. Currently, when energy stored in the battery within the portable device is exhausted, the user sometimes utilizes a power bank to charge the battery within the portable device. However, it is inconvenient and annoying for the user to simultaneously carry the power bank and the portable device. In addition, although it is convenient for the user that the user utilizes an alternating current power source provided by a store to charge the battery within the portable device, how to properly charge the user will disturb the user and the store. Therefore, how to design a charge fare meter will be an important issue for a designer of the portable device.

SUMMARY OF THE INVENTION

A first embodiment of the present invention provides a charge fare meter. The charge fare meter includes a charge module and a display. The charge module is used for outputting a direct (DC) current and calculating total charges, wherein the charge module includes an input interface, a calculating unit, and an output interface. The input interface is used for converting power provided by an alternating current (AC) power source or a DC power source into the DC current. The calculating unit is electrically connected to the input interface for calculating the total charges. The output interface is electrically connected to the calculating unit for outputting the DC current. The display is electrically connected to the charge module for displaying the DC current, a voltage corresponding to the DC current, or a charge fare corresponding to the total charges.

A second embodiment of the present invention provides a charge fare meter. The charge fare meter includes a charge module and a wireless module. The charge module is used for outputting a DC current and calculating total charges, wherein the charge module includes an input interface, a calculating unit, and an output interface. The input interface is used for converting power provided by an alternating current (AC) power source or a DC power source into the DC current. The calculating unit is electrically connected to the input interface for calculating the total charges. The output interface is electrically connected to the calculating unit for outputting the DC current. The wireless module is electrically connected to the charge module for transmitting a value of the DC current, a value of a voltage corresponding to the DC current, or a charge fare corresponding to the total charges to an external device through a wireless method, wherein the external device displays the value of the DC current, the value of the voltage corresponding to the DC current, or the charge fare corresponding to the total charges.

A third embodiment of the present invention provides a charge fare meter. The charge fare meter includes a charge module, a display, and a cable. The charge module is used for outputting a direct (DC) current and calculating total charges, wherein the charge module includes an input interface, a calculating unit, and an output interface. The input interface is used for converting power provided by an alternating current (AC) power source or a DC power source into the DC current. The calculating unit is electrically connected to the input interface for calculating the total charges. The output interface is electrically connected to the calculating unit for outputting the DC current. The display is electrically connected to the charge module for displaying the DC current, a voltage corresponding to the DC current, or a charge fare corresponding to the total charges. The charge module and the display are attached to the cable, wherein a plug is positioned at one end of the cable and is electrically connected to the input interface of the charge module which is capable to receive power from the AC power source or the DC power source.

The present invention provides a charge fare meter. The charge fare meter utilizes a calculating unit to measure a DC current generated by an input interface, record a charging period of a portable device electrically connected to the charge fare meter, calculate total charges passing through a charge module during the charging period of the portable device according to the DC current and the charging period of the portable device, and generate a charge fare corresponding to the total charges according to a storage device and the total charges. In addition, the input interface can generate different DC currents and/or different DC voltage to meet specifications of the portable device, an interface protocol, or a requirement of a user, and an output interface can output the DC current to the portable device according to the specifications of the portable device, the interface protocol, or the requirement of the user. Therefore, compared to the prior art, because the present invention can convert power provided by a power source into the DC current meeting the specifications of the portable device, the interface protocol, or the requirement of the user according to the specifications of the portable device, the interface protocol, or the requirement of the user, and the present invention can generate the charge fare corresponding to the total charges passing through the charge module during the charging period of the portable device, charging selection of the present invention is more flexible (that is, the user can select the DC current outputted by the charge module according to the requirement thereof, wherein the DC current needs to meet the specifications of the portable device and the interface protocol) and a store can properly charge the user for the charge fare according to the charge fare corresponding to the total charges passing through the charge module during the charging period of the portable device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
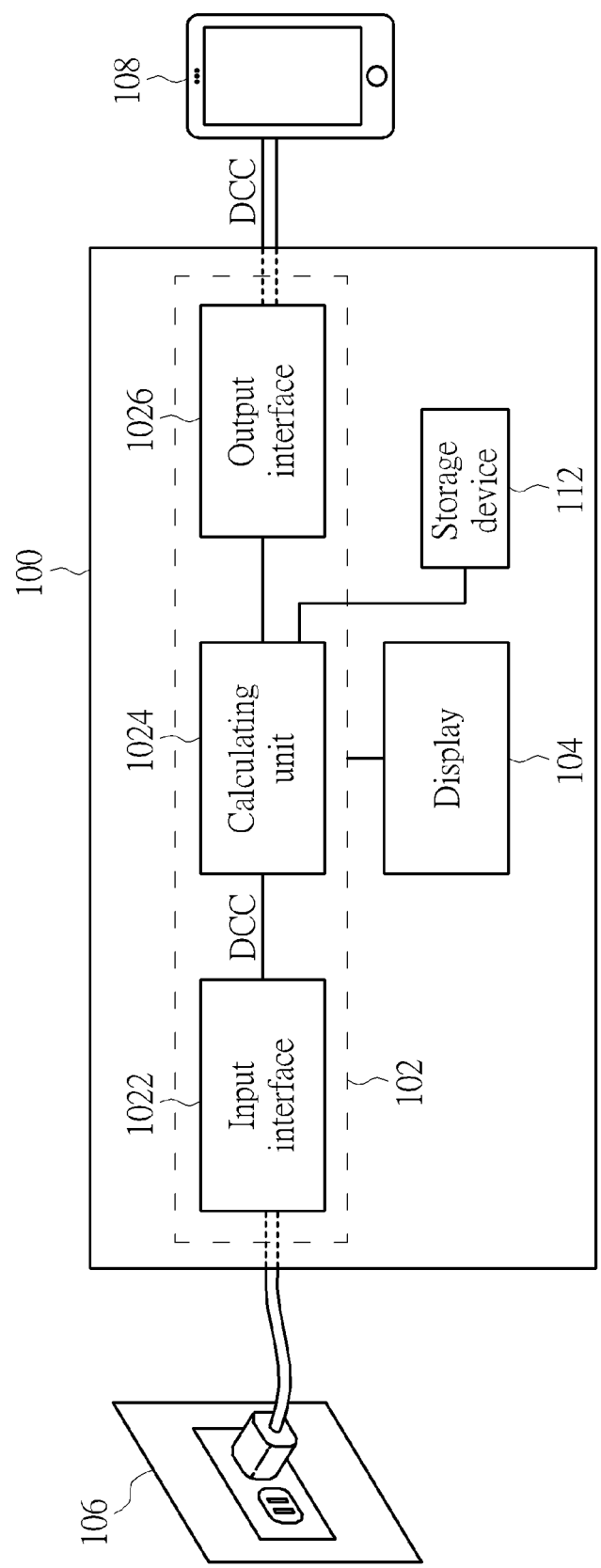
FIG. 1 is a diagram illustrating a charge fare meter according to a first embodiment of the present invention.
Figure 2:
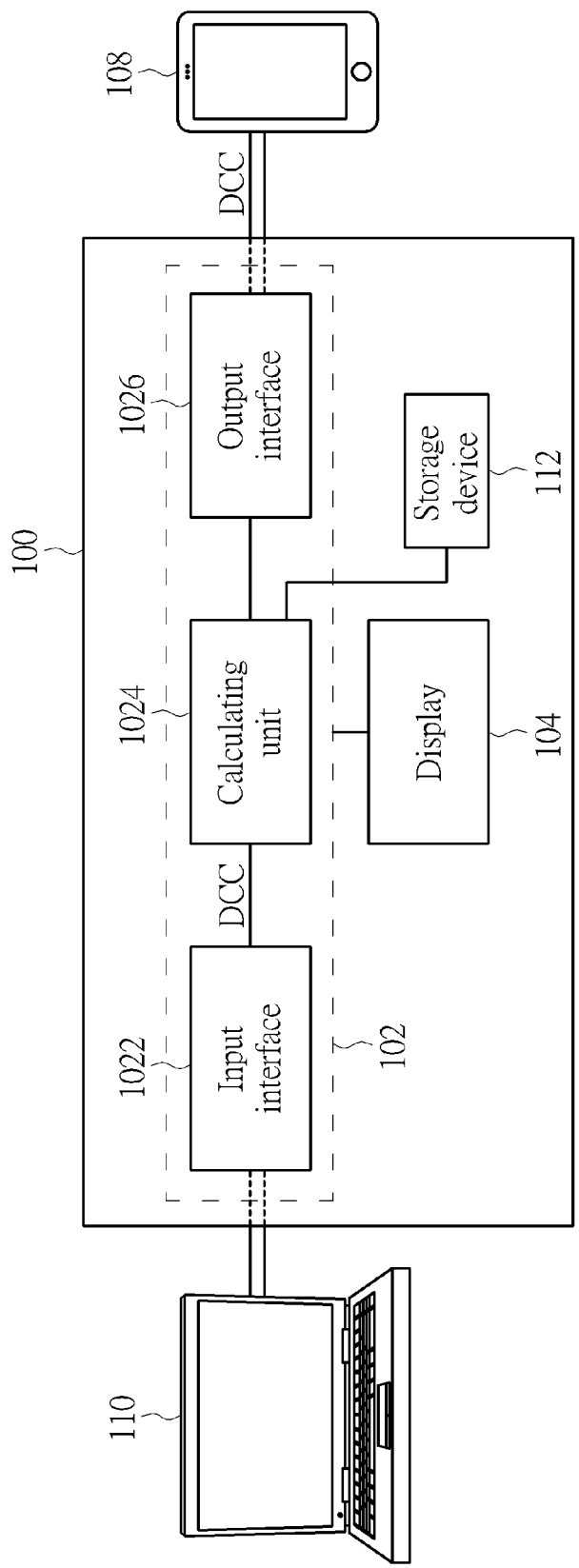
FIG. 2 is a diagram illustrating the input interface being electrically connected to the DC power source.

Please refer to FIG. 1. FIG. 1 is a diagram illustrating a charge fare meter 100 according to a first embodiment of the present invention. As shown in FIG. 1, the charge fare meter 100 includes a charge module 102 and a display 104, wherein the charge module 102 includes an input interface 1022, a calculating unit 1024, and an output interface 1026. As shown in FIG. 1, the input interface 1022 is electrically connected to an alternating current (AC) power source 106, and converts power provided by the AC power source 106 into a direct (DC) current DCC meeting specifications (e.g. a tolerance range of an input current and a tolerance range of an input voltage of a portable device 108 (e.g. a cell phone)) of the portable device 108 electrically connected to the output interface 1026, an interface protocol (e.g. a universal serial bus power delivery protocol), or a requirement of a user according to the specifications of the portable device 108, the interface protocol, or the requirement of the user. That is to say, the input interface 1022 can generate different DC currents and/or different DC voltages to meet the specifications of the portable device 108, the interface protocol, or the requirement of the user. In addition, when a voltage and a current for charging the portable device 108 meet the requirement of the user, the voltage and the current for charging the portable device 108 also need to meet the specifications of the portable device 108, meet the interface protocol, or simultaneously meet the specifications of the portable device 108 and the interface protocol. For example, when the tolerance range of the input current of the portable device 108 is 500 mA-1500 mA and the tolerance range of the input voltage of the portable device 108 is 15V-5V, the voltage meeting the requirement of the user needs to be between the tolerance range of the input voltage of the portable device 108 (15V-5V) and the current meeting the requirement of the user needs to be between the tolerance range of the input current of the portable device 108 (500 mA-1500 mA). That is to say, the user can select a pair of current and voltage supported by the output interface 1026 within the tolerance range of the input current of the portable device 108 (500 mA-1500 mA) and the tolerance range of the input voltage of the portable device 108 (15V-5V) to charge the portable device 108. In addition, a relationship between the requirement of the user and the universal serial bus power delivery protocol is the same as the above mentioned relationship between the requirement of the user and the specifications of the portable device 108, so further description thereof is omitted for simplicity. In addition, as shown in FIG. 2, the input interface 1022 can also be electrically connected to a DC power source 110 (e.g. a notebook computer), and converts power provided by the DC power source 110 into the DC current DCC meeting the specifications of the portable device 108, the interface protocol, or the requirement of the user according to the specifications of the portable device 108, the interface protocol, or the requirement of the user. Therefore, as shown in FIG. 1 and FIG. 2, the input interface 1022 can convert power provided by a power source (e.g. the AC power source 106 or the DC power source 110) into the DC current DCC meeting the specifications of the portable device 108, the interface protocol, or the requirement of the user according to the specifications of the portable device 108, the interface protocol, or the requirement of the user.

As shown in FIG. 1, the calculating unit 1024 is electrically connected to the input interface 1022 for measuring the DC current DCC, recording a charging period of the portable device 108, and calculating total charges passing through the charge module 102 during the charging period of the portable device 108 according to the DC current DCC and the charging period of the portable device 108. For example, the calculating unit 1024 can include an integrator, wherein the integrator is used for calculating the total charges passing through the charge module 102 during the charging period of the portable device 108 according to the DC current DCC and the charging period of the portable device 108. In addition, in another embodiment of the present invention, the calculating unit 1024 not only can measure the DC current DCC and record the charging period of the portable device 108, but can also measure the voltage corresponding to the DC current DCC. In addition, As shown in FIG. 1, the charge fare meter 100 further includes a storage device 112 electrically connected to the calculating unit 1024, wherein the storage device 112 is used for storing a relationship between charges and fares, so the calculating unit 1024 can generate the charge fare corresponding to the total charges passing through the charge module 102 during the charging period of the portable device 108 according to the storage device 112 and the total charges passing through the charge module 102 during the charging period of the portable device 108. In addition, the user can adjust the relationship between charges and fares stored in the storage device 112 anytime.

Figure 3:
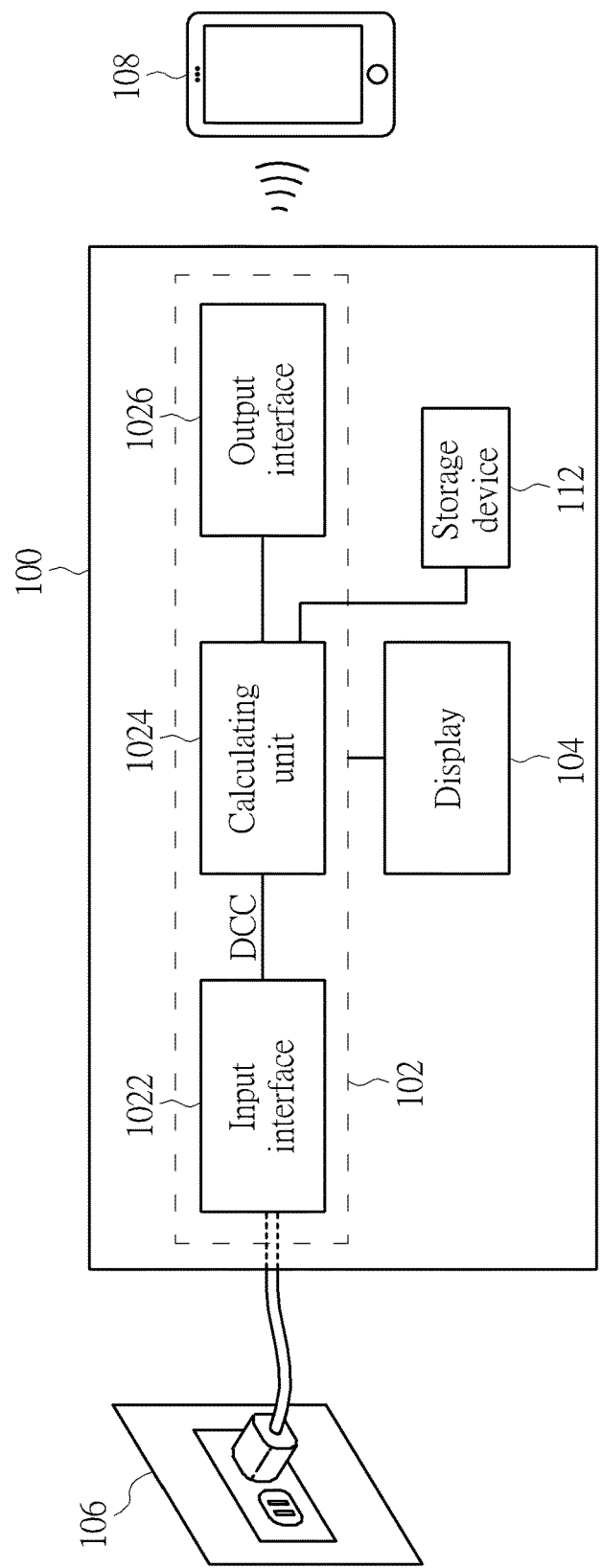
FIG. 3 is a diagram illustrating output interface utilizing the wireless method to charge the portable device.

As shown in FIG. 1, the output interface 1026 is electrically connected to the calculating unit 1024 for being connected to the portable device 108, and outputting the DC current DCC to the portable device 108 according to the specifications of the portable device 108, the interface protocol, or the requirement of the user, wherein the DC current DCC is used for charging the portable device 108, the output interface 1026 needs to support the specifications of the portable device 108, the interface protocol, or the requirement of the user, and the output interface 1026 can be a mobile industry processor interface (MIPI) or a universal serial bus (USB) interface. But, in another embodiment of the present invention (as shown in FIG. 3), when the output interface 1026 is a Near Field Communication (NFC) interface, a wireless LAN (WLAN) interface, an IEEE 802.15.4 (Zigbee) interface, a Bluetooth interface, a Wireless Wide Area Network (WWAN) interface, a Global System for Mobile Communications (GSM) interface, a General Packet Radio Service (GPRS) interface, a third generation (3G) interface, a fourth generation (4G) interface, a fifth generation (5G) interface, or an Actor Network Theory+ (Ant+) interface, the output interface 1026 can charge the portable device 108 through a wireless method. In addition, in another embodiment of the present invention, the output interface 1026 can further detect a charging state (e.g. "charge full" state or "stop charge" state) of a battery within the portable device 108 and a charging percentage of the battery within the portable device 108, wherein when the output interface 1026 detects "charge full" state or "stop charge" state of the battery within the portable device 108, the output interface 1026 will not output the DC current DCC to the portable device 108 to protect the portable device 108.

As shown in FIG. 1, the display 104 is electrically connected to the charge module 102, wherein the display 104 is used for displaying the DC current DCC, the voltage corresponding to the DC current DCC, or the charge fare corresponding to the total charges passing through the charge module 102 during the charging period of the portable device 108. But, in another embodiment of the present invention, the display 104 is used for displaying the charging period of the portable device 108, the DC current DCC, the voltage corresponding to the DC current DCC, the charge fare corresponding to the total charges passing through the charge module 102 during the charging period of the portable device 108, the charging percentage of the battery within the portable device 108, or the charging state of the battery within the portable device 108. But, in another embodiment of the present invention, the display 104 utilizes a wireless method to communicate with the charge module 102. Thus, because the display 104 can display the charge fare corresponding to the total charges passing through the charge module 102 during the charging period of the portable device 108, the user can pay the charge fare to a store providing the AC power source 106 according to the charge fare displayed by the display 104 if the user adjusts the relationship between charges and fares stored in the storage device 112 according to a standard charge of the store providing the AC power source 106.

Figure 4:
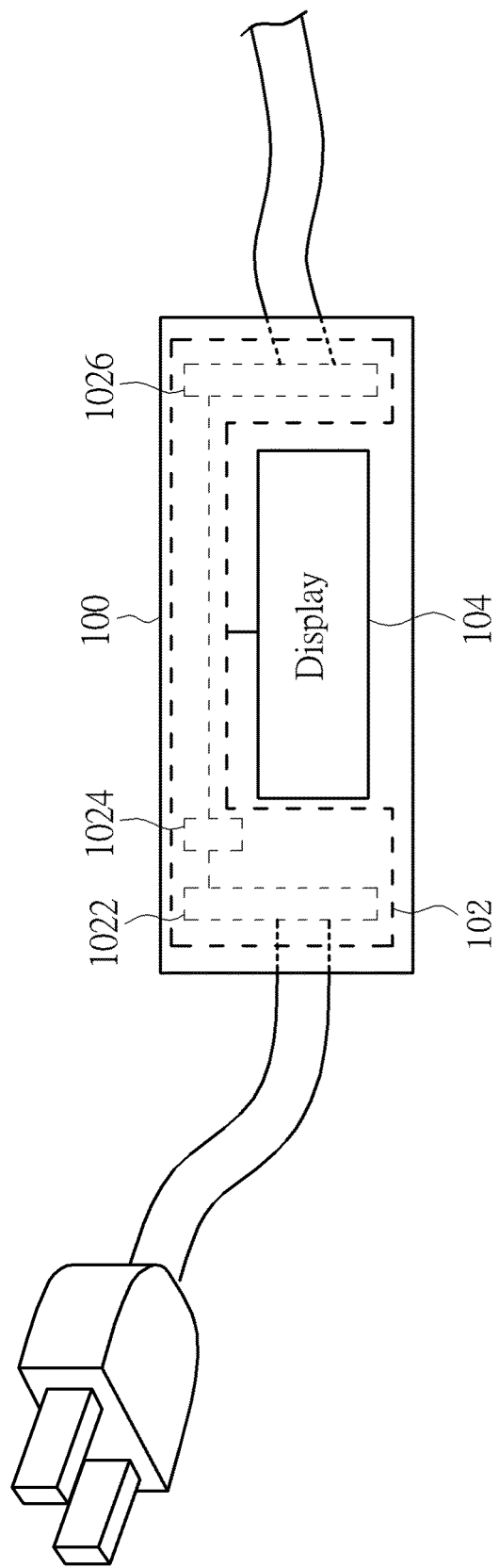
FIG. 4 is a diagram illustrating a profile of the charge fare meter.

In addition, please refer to FIG. 4. FIG. 4 is a diagram illustrating a profile of the charge fare meter 100. As shown in FIG. 4, the charge fare meter 100 can have a cable-shape profile. A plug is positioned at one end of the cable and is electrically connected to the input interface of the charge module which can receive power from an alternating current (AC) power source or the DC power source. But, the present invention is not limited to the cable-shape profile shown in FIG. 4.

Figure 5:
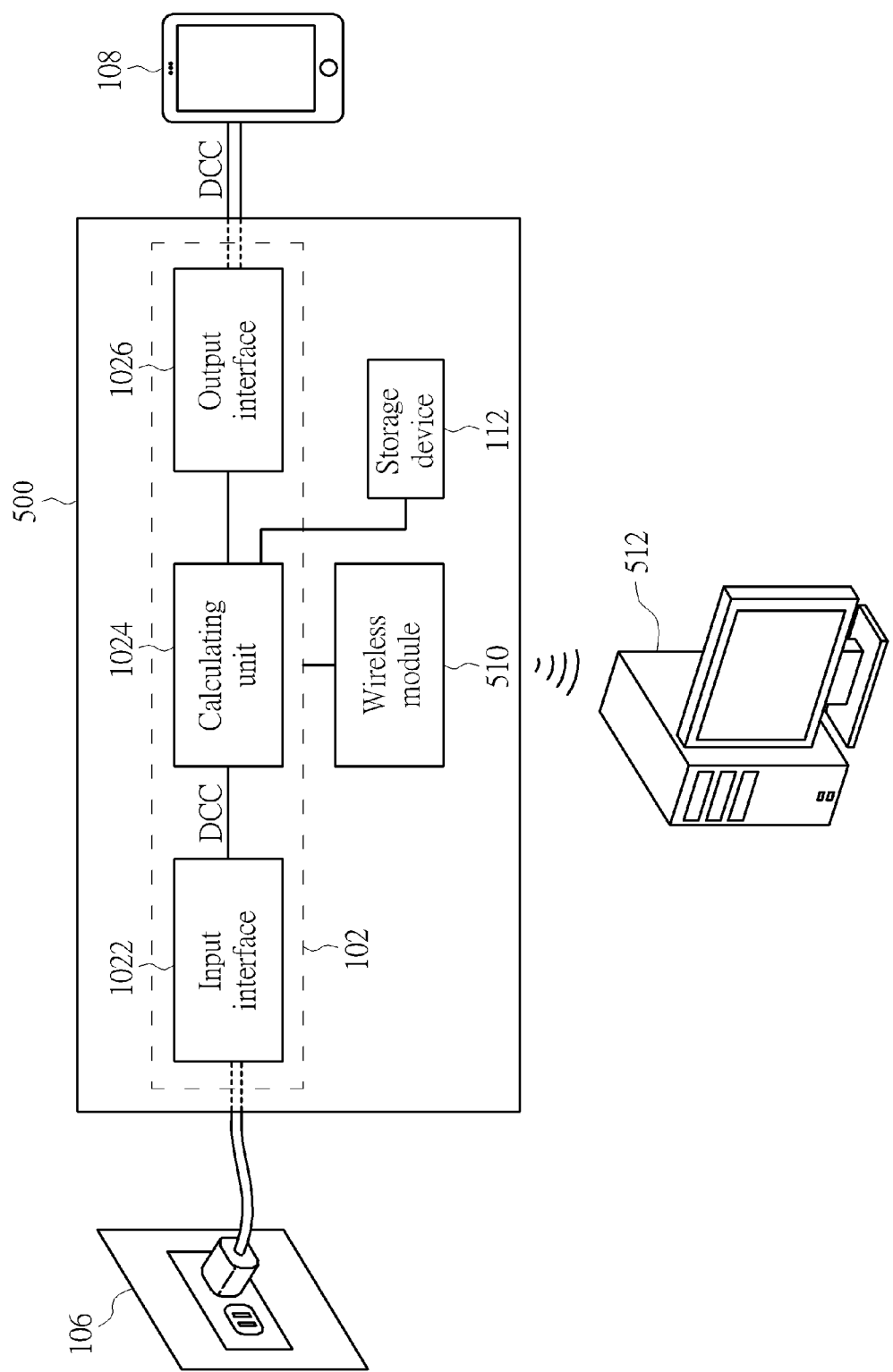
FIG. 5 is a diagram illustrating a charge fare meter according to a second embodiment of the present invention.

Please refer to FIG. 5. FIG. 5 is a diagram illustrating a charge fare meter 500 according to a second embodiment of the present invention. As shown in FIG. 5, a difference between the charge fare meter 500 and the charge fare meter 100 is that the charge fare meter 500 does not include the display 104, but the charge fare meter 500 includes a wireless module 510, wherein the wireless module 510 is a NFC wireless module, a WLAN wireless module, an IEEE 802.15.4 (Zigbee) wireless module, a Bluetooth wireless module, a WWAN wireless module, a GSM wireless module, a GPRS wireless module, a 3G wireless module, a 4G wireless module, a 5G wireless module, or an Ant+ wireless module. As shown in FIG. 5, the wireless module 510 is used for transmitting the charging period of the portable device 108, a value of the DC current DCC, a value of the voltage corresponding to the DC current DCC, the charge fare corresponding to the total charges passing through the charge module 102 during the charging period of the portable device 108, the charging percentage of the battery within the portable device 108, or the charging state of the battery within the portable device 108 to an external device 512 (e.g. a computer) through a wireless method, wherein after the external device 512 receives the charging period of the portable device 108, the value of the DC current DCC, the value of the voltage corresponding to the DC current DCC, the charge fare corresponding to the total charges passing through the charge module 102 during the charging period of the portable device 108, the charging percentage of the battery within the portable device 108, or the charging state of the battery within the portable device 108, the external device 512 can display the charging period of the portable device 108, the value of the DC current DCC, the value of the voltage corresponding to the DC current DCC, the charge fare corresponding to the total charges passing through the charge module 102 during the charging period of the portable device 108, the charging percentage of the battery within the portable device 108, or the charging state of the battery within the portable device 108. In addition, subsequent operational principles of the charge fare meter 500 are the same as those of the charge fare meter 100, so further description thereof is omitted for simplicity.

To sum up, the charge fare meter utilizes the calculating unit to measure the DC current generated by the input interface, record the charging period of the portable device, calculate the total charges passing through the charge module during the charging period of the portable device according to the DC current and the charging period of the portable device, and generate the charge fare corresponding to the total charges according to the storage device and the total charges. In addition, the input interface can generate different DC currents and/or different DC voltage to meet the specifications of the portable device, the interface protocol, or the requirement of the user, and the output interface can output the DC current to the portable device according to the specifications of the portable device, the interface protocol, or the requirement of the user. Therefore, compared to the prior art, because the present invention can convert power provided by the power source (e.g. the AC power source or the DC power source) into the DC current meeting the specifications of the portable device, the interface protocol, or the requirement of the user according to the specifications of the portable device, the interface protocol, or the requirement of the user, and the present invention can generate the charge fare corresponding to the total charges passing through the charge module during the charging period of the portable device, charging selection of the present invention is more flexible (that is, the user can select the DC current outputted by the charge module according to the requirement thereof, wherein the DC current needs to meet the specifications of the portable device and the interface protocol) and the store can properly charge the user for the charge fare according to the charge fare corresponding to the total charges passing through the charge module during the charging period of the portable device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A charge fare meter, comprising:
a charge module outputting different DC currents and calculating total charges corresponding to each DC current of the different DC currents, wherein the charge module comprises:
an input interface converting power provided by an alternating current (AC) power source or a DC power source into the each DC current;
a calculating unit electrically connected to the input interface for calculating the total charges; and
an output interface electrically connected to the calculating unit for outputting the each DC current;
wherein the charge module converts the power into the each DC current according to specifications of a portable device electrically connected to the output interface, an interface protocol, and a requirement from outside of the charge fare meter, and the portable device corresponds to the each DC current; and a wireless module electrically connected to the charge module for transmitting a value of the each DC current, a value of a voltage corresponding to the each DC current, or a charge fare corresponding to the total charges to an external device through a wireless method, wherein the external device displays the value of the each DC current, the value of the voltage corresponding to the each DC current, or the charge fare corresponding to the total charges;

wherein the charge module and the wireless module are integrated into a cable.

2. The charge fare meter of claim 1, wherein the wireless module is a Near Field Communication (NFC) wireless module, a wireless LAN (WLAN) wireless module, an IEEE 802.15.4 (Zigbee) wireless module, a Bluetooth wireless module, a Wireless Wide Area Network (WWAN) wireless module, a Global System for Mobile Communications (GSM) wireless module, a General Packet Radio Service (GPRS) wireless module, a third generation (3G) wireless module, a fourth generation (4G) wireless module, a fifth generation (5G) wireless module, or an Actor Network Theory+ (Ant+) wireless module.

3. The charge fare meter of claim 1, wherein the calculating unit calculates the total charges according to the each DC current and a charging period of the portable device electrically connected to the output interface.

4. The charge fare meter of claim 1, wherein the output interface outputs the each DC current to the portable device electrically connected to the output interface.

5. The charge fare meter of claim 1, wherein the output interface is a NFC interface, a WLAN interface, a Zigbee interface, a Bluetooth interface, a WWAN interface, a GSM interface, a GPRS interface, a 3G interface, a 4G interface, a 5G interface, or an Ant+ interface.

6. The charge fare meter of claim 1, wherein the calculating unit further measures the voltage corresponding to the each DC current.

7. The charge fare meter of claim 1, wherein the output interface further detects a charging state of a battery within the portable device electrically connected to the output interface.

8. The charge fare meter of claim 1, further comprising:
a storage device electrically connected to the calculating unit for storing a relationship between charges and fares, wherein the calculating unit further generates the charge fare according to the storage device and the total charges.

9. A charge fare meter, comprising:
a charge module outputting different direct (DC) currents and calculating total charges corresponding to each DC current of the different DC currents, wherein the charge module comprises:
an input interface converting power provided by an alternating current (AC) power source or a DC power source into the each DC current;
a calculating unit electrically connected to the input interface for calculating the total charges; and
an output interface electrically connected to the calculating unit for outputting the each DC current, wherein the charge module converts the power into the each DC current according to specifications of a portable device electrically connected to the output interface, an interface protocol, and a requirement from outside of the charge fare meter, and the portable device corresponds to the each DC current; and a display electrically connected to the charge module for displaying the each DC current, a voltage corresponding to the each DC current, or a charge fare corresponding to the total charges;

wherein the charge module and the display are integrated into a cable.

* * * * *